US008036223B2

(12) United States Patent  
Sau et al.

(10) Patent No.: US 8,036,223 B2  
(45) Date of Patent: Oct. 11, 2011

(54) METHOD, APPARATUS AND SYSTEM FOR IMPROVING PACKET THROUGHPUT BASED ON CLASSIFICATION OF PACKET LOSS IN DATA TRANSMISSIONS

(75) Inventors: Jonathan Sau, Waterloo (CA); Xinhua Ling, Waterloo (CA); Bruno Preiss, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 196 days.

(21) Appl. No.: 12/393,327

(22) Filed: Feb. 26, 2009

(65) Prior Publication Data

US 2010/0214921 A1    Aug. 26, 2010

(51) Int. Cl.
- H04L 12/56 (2006.01)
- G01R 31/08 (2006.01)
- H04W 4/00 (2009.01)

(52) U.S. Cl. .................. 370/394; 370/230; 370/328

(58) Field of Classification Search .............. 370/328, 370/329, 330, 229, 230, 231, 232, 233, 235, 370/236, 216, 395.21; 709/203, 209
See application file for complete search history.

(56) References Cited

U.S. PATENT DOCUMENTS

| | | | |
|---|---|---|---|
| 5,913,041 A * | 6/1999 | Ramanathan et al. | 709/233 |
| 6,097,697 A | 8/2000 | Yao et al. | |
| 7,355,997 B2 * | 4/2008 | Qian et al. | 370/328 |
| 7,742,420 B2 * | 6/2010 | Chapman et al. | 370/236 |
| 2006/0039285 A1 * | 2/2006 | Chapman et al. | 370/235 |
| 2007/0070892 A1 | 3/2007 | Lee et al. | |
| 2008/0008092 A1 * | 1/2008 | Wang et al. | 370/235 |

FOREIGN PATENT DOCUMENTS

| | | |
|---|---|---|
| EP | 1211864 A2 | 6/2002 |
| WO | 2005/011187 A1 | 2/2005 |

OTHER PUBLICATIONS

An Adaptive End-to End Loss Differentiation Scheme for TCP over Wired/Wireless Networks—IJCSNS International—Chang-hyeon Lim and Ju-wook Jang, Journal of Computer Science and network Security, vol. 7, No. 3, Mar. 2007.

"De-randomizing" Congestion Losses to Improve TCP Performance over Wired-Wireless Networks—Saad Biaz and Nitin H. Vaidya.

TCP Selective Acknowledgement Options by M. Mathis et al.—Oct. 1996.

An Extension to the Selective Acknowledgement (SACK) Option for TCP by A. Floyd et al., Jul. 2000.

(Continued)

*Primary Examiner* — Hanh Nguyen

(74) *Attorney, Agent, or Firm* — David J. Johnson; Stephen J. Perry; Perry + Currier Inc.

(57) ABSTRACT

A method, apparatus and system for managing loss of packets in data transmissions is provided. In a method embodiment, selective acknowledgements are received at a sending computer from a receiving computer. The sending computer is configured to analyze patterns in the selective acknowledgements and infer a type of packet loss. As a result of the inference, the packet delivery strategy from the sending computer can be adjusted.

27 Claims, 8 Drawing Sheets

OTHER PUBLICATIONS

Chrungoo A. et al. "TCP K-Sack: A Simple Protocol to Improve Performance over Lossy Links" GLOBCOM'01. 2001 IEEE Globaltelecommunications Conference, San Antonio, TX, Nov. 25-29, 2001; [IEEE Global Telecommunications Conference], New York, NY: IEEE, US, Nov. 25, 2001, pp. 1713-1717, XP001054870, ISBN: 978-0-7803-7206-1.

Varshney U: "Selective Slow Start: a simple algorithm for improving TCP performance in wireless ATM environment" MILCOM 97 Proceeding Monterey, CA, USA, Nov. 2-5, 1997, New York, NY, USA, IEEE, US, vol. 1, Nov. 2, 1997, pp. 465-469, XP01026087, ISBN 978-0-7803-4249-1.

European Patent Application No. 09 15 3830—Search Report dated Aug. 18, 2009.

* cited by examiner

Fig. 6

Block 305 (Second example)

| NR Pb-1 | NR Pb-2 | R Pb-3 | R Pb-4 | R Pb-5 | NR Pb-6 | R Pb-7 | NR Pb-8 |

Sb

METHOD, APPARATUS AND SYSTEM FOR IMPROVING PACKET THROUGHPUT BASED ON CLASSIFICATION OF PACKET LOSS IN DATA TRANSMISSIONS

FIELD

The present specification relates generally to computing and more specifically relates to a method, apparatus and system for improving packet throughput based on classification of packet loss in data transmissions.

BACKGROUND

Many network transport protocols (like the Transmission Control Protocol (TCP)) feature adaptive congestion control mechanisms, in which the data transmission rate is dynamically adjusted to the network condition in order to utilize the available bandwidth optimally. For example, when available bandwidth is detected, the transport protocol increases the rate of data transmission. When network congestion is detected, the transport protocol reduces the rate of data transmission. Some network transport protocols use packet loss as an indication that network congestion has occurred. While this method is well suited to networks in which the predominant cause of packet loss is network congestion, it does not work well in networks in which a non-negligible amount of packet loss is caused by reasons other than network congestion. For example, in a wireless network, a significant source of packet loss is due to transmission errors caused by fluctuating signal strength, thermal noise and interference. Furthermore, despite the application of error control technique like forward error correction (FEC) and/or automatic retransmission requests (ARQ), there are often residual transmission errors that are not detected by the error control technique. For transport protocols using packet loss as an indication of network congestion, this will result in the sender unnecessarily reducing the data transmission rate, resulting in poor link utilization.

Various solutions have been proposed. For example, "De-randomizing" Congestion Losses To Improve TCP Performance over Wired-Wireless Networks" by Saad Biaz and Nitin H. Vaidya dated Sep. 27, 2004, ACM/IEEE Transactions on Networking June 2005, proposes one solution which relies on having a bottleneck network node that supports drop precedence.

As another example, "An Adaptive End-to-End Loss Differentiation Scheme for TCP over Wired/Wireless Networks" by Chang-hyeon Lim, and Ju-wook Jang IJCSNS International Journal of Computer Science and Network Security, VOL. 7 No. 3, March 2007 at page 72, proposes another solution, which uses the variation of round trip time (RTT) as the detection signature.

The inventors believe that other solutions for improving packet throughput can be provided.

BRIEF DESCRIPTION OF THE DRAWINGS

FIG. 6 shows a representation of the structure of selective acknowledgements from FIG. 5.

DESCRIPTION

Figure 1:
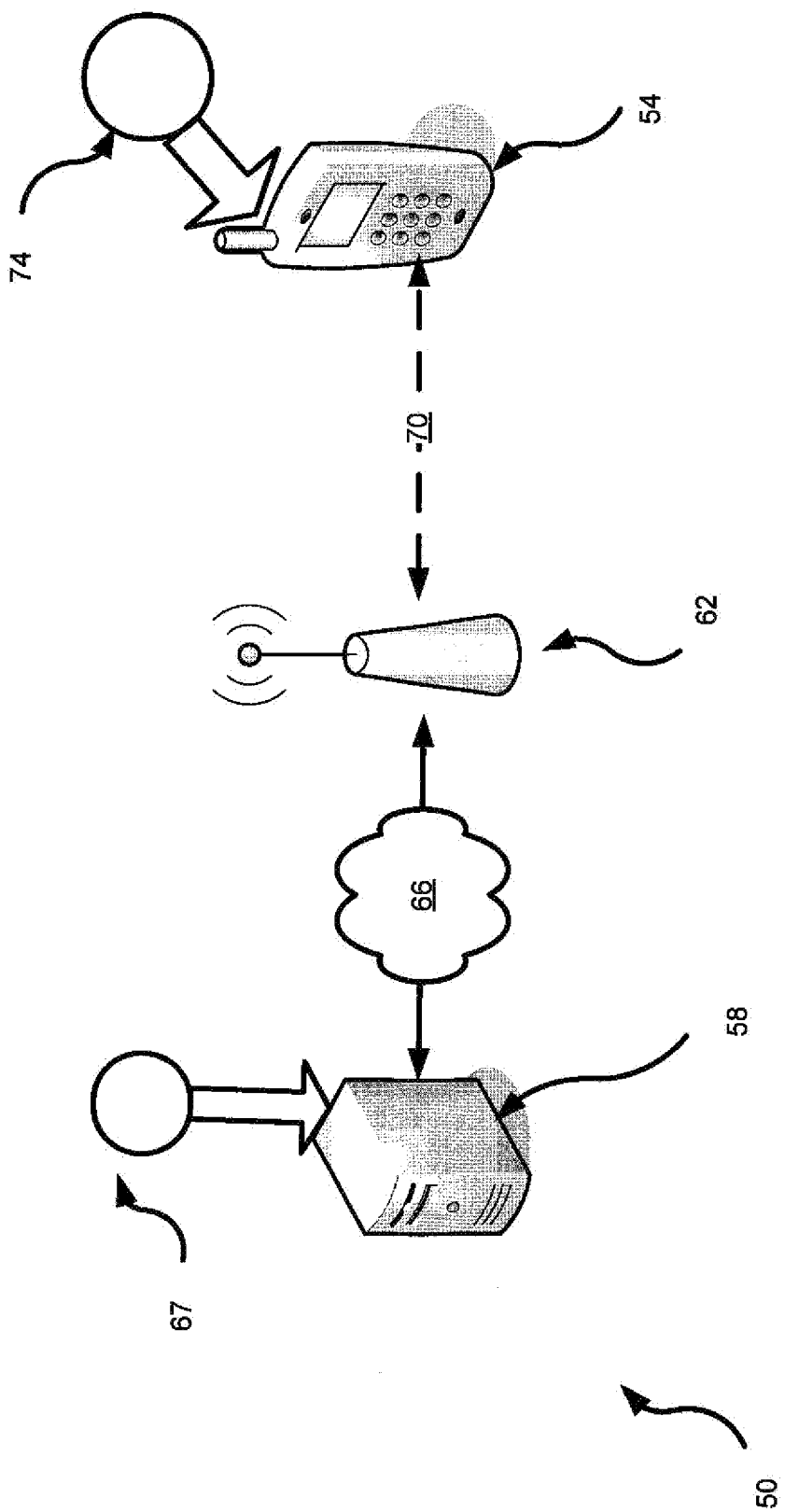
FIG. 1 shows a schematic representation of a system for improving packet throughput based on classification of packet loss in data transmissions.

An aspect of the specification provides a method for improving packet throughput comprising:
receiving, at a sending computer, selective acknowledgements from a receiving computer that is connected to said sending computer by a link that is shared with at least one additional computer; said selective acknowledgements responsive to packets sent from said sending computer to said receiving computer according to a delivery strategy;
determining from said selective acknowledgements whether any of said packets were lost;
if said selective acknowledgements indicate none of said packets were lost, maintaining said delivery strategy;
if said selective acknowledgements indicate packets were lost, determining if any of said lost packets were clustered;
if said lost packets were clustered, adjusting said delivery strategy using a first factor to accommodate a first type of packet loss.

The method can further comprise: if said lost packets were not clustered, adjusting said delivery strategy using a second factor to accommodate a second type of packet loss.

The first type of packet loss can be loss due to congestion on said link.

The first factor can comprise reducing a data transmission rate.

The second type of packet loss can be loss due to transmission errors.

At least a portion of the link can be wireless and said transmission errors can occur over said wireless portion. At least a portion of said link can be characterized by a non-negligible chance of packet loss due to transmission error.

The second factor can comprise no adjustment to said delivery strategy.

The first type of packet loss can be congestion loss and at the same time the second type of packet loss can be loss due to transmission errors. In this case the first factor can comprise reducing a data transmission rate by a first amount and said second factor can comprise reducing said data transmission rate by a second amount, and the second amount is less than said first amount. The second amount can be zero.

The method can further comprise, where said lost packets were not clustered, maintaining said delivery strategy.

Another aspect of the specification provides a computer comprising an interface connected to a network configured to receive selective acknowledgements from a receiving computer that is connected to said interface by a link that is shared with at least one additional computer. The selective acknowledgements are responsive to packets sent via said interface to said receiving computer according to a delivery strategy. The computer also comprises a processor connected to said interface and is configured to maintain said delivery strategy. The processor is further configured to determine from said selective acknowledgements whether any of said packets were lost. The processor further is configured to maintain said delivery strategy if said selective acknowledgements indicate none of said packets were lost. The processor is further configured to determine whether any of said lost packets were clustered if said selective acknowledgements indicate packets were lost. The processor is also configured to adjust said delivery strategy using a first factor to accommodate a first type of packet loss if said lost packets were clustered The processor can be further configured to adjust said delivery strategy using a second factor if said lost packets were not clustered in order to accommodate a second type of packet loss.

The sending or receiving computer can be a portable electronic device.

The sending computer or recipient can be a server.

Another aspect of the specification provides a system comprising a sending computer connectable to a link and a receiving computer connectable to said sending computer via said link. The sending computer is configured to receive selective acknowledgements from said receiving computer. The selective acknowledgements are responsive to packets sent from said sending computer to said receiving computer according to a delivery strategy. The sending computer is configured to maintain said delivery strategy. The sending computer is further configured to determine from said selective acknowledgements whether any of said packets were lost. The sending computer is further configured to maintain said delivery strategy if said selective acknowledgements indicate none of said packets were lost. The sending computer is further configured to determine whether any of said lost packets were clustered if said selective acknowledgements indicate packets were lost. The sending computer is further configured to adjust said delivery strategy using a first factor to accommodate a first type of packet loss if said lost packets were clustered.

Another aspect of the specification comprises a computer readable storage device, such as a persistent or volatile storage device, containing programming instructions executable on a processor of a sending server; said programming instructions comprising the method of:

receiving, at a sending computer, selective acknowledgements from a receiving computer that is connected to said sending computer by a link that is shared with at least one additional computer; said selective acknowledgements responsive to packets sent from said sending computer to said receiving computer according to a delivery strategy;

determining from said selective acknowledgements whether any of said packets were lost;

if said selective acknowledgements indicate none of said packets were lost, maintaining said delivery strategy;

if said selective acknowledgements indicate packets were lost, determining if any of said lost packets were clustered;

if said lost packets were clustered, adjusting said delivery strategy using a first factor to accommodate a first type of packet loss.

Referring now to FIG. 1, an exemplary system for improving packet throughput based on classification of packet loss in data transmissions is indicated generally at 50. In a present embodiment system 50 comprises at least one portable computing device 54, and a server 58. A wireless base station 62 interconnects computing device 54 and mediation server 58. As will be discussed further below, in more general terms server 58 can be considered a sending computer and computing device 54 can be considered a receiving computer. In certain variations, these roles can be reversed. In other variations the sending computer can be either a computing device or a server, while the receiving computer can also be either a computing device or a server.

A backhaul link 66 connects base station 62 with server 58. Backhaul link 66 can be based on a broader network infrastructure such as the Internet. In a present example it will be assumed that backhaul link 66 is a wired link.

A wireless link 70 connects base station 62 with computing device 54. Link 70 can be based on a variety of protocols, including, without limitation, Global System for Mobile communications (GSM), General Packet Radio Service (GPRS), Enhanced Data Rates for GSM Evolution (EDGE), 3G, 4G, Universal Mobile Telecommunications System (UMTS), Institute of Electrical and Electronics Engineers (IEEE) Standard 802.11, IEEE 802.15, Bluetooth.

Computing device 54 is configured to maintain and execute a first packet manager application 74, and server 58 is configured to maintain a second packet manager 67 which will be discussed further below.

Figure 2:
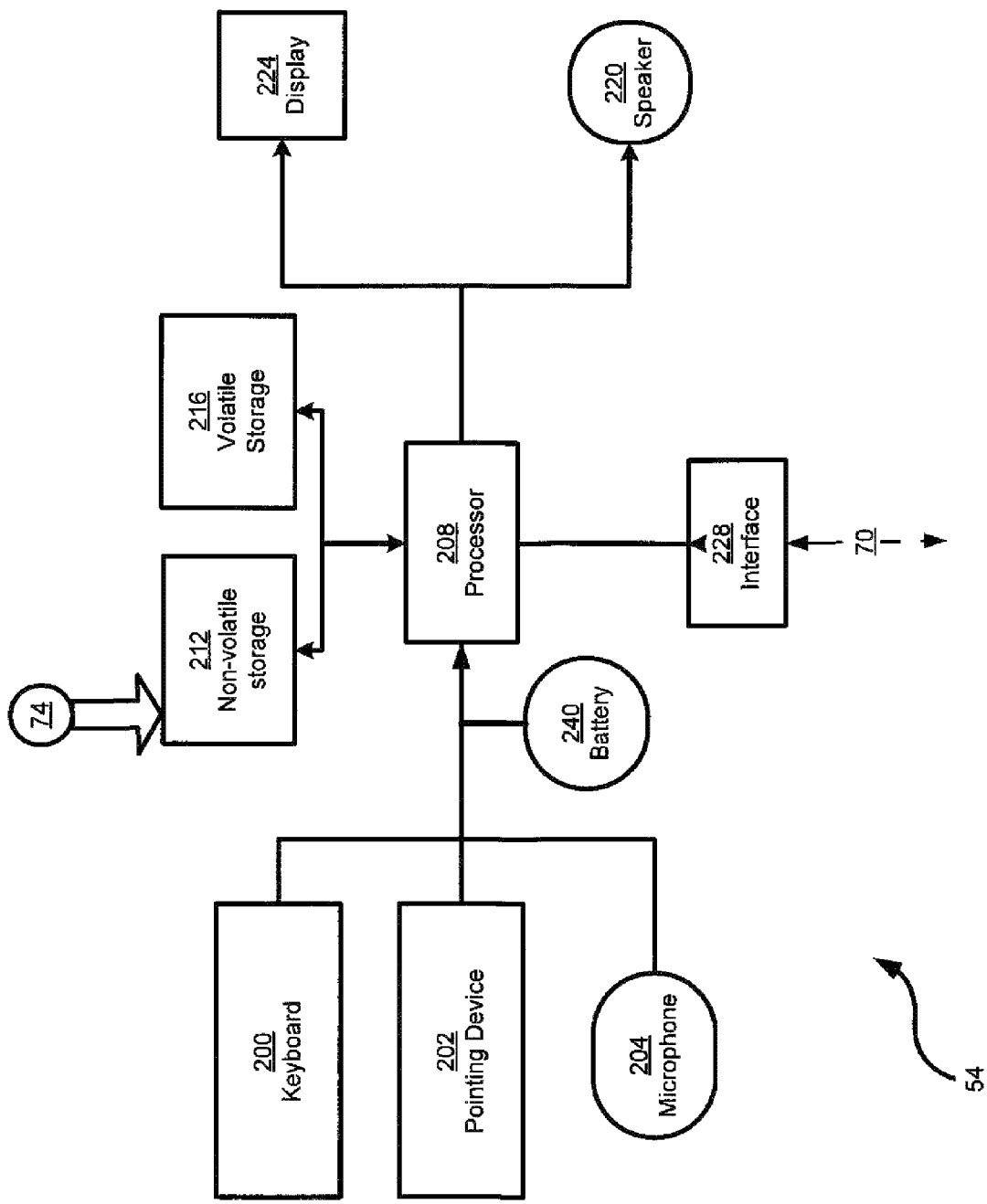
FIG. 2 shows a schematic representation of the portable computing device of FIG. 1.

Referring briefly now to FIG. 2, computing device 54 can be any type of electronic device that can be used in a self-contained manner and to interact with server 58. Interaction includes displaying information on a display of computing device 54 based on content received over link 70, as well as receiving input at computing device 54 that can in turn be sent back over link 70. It should be emphasized that the structure in FIG. 2 is purely exemplary, and contemplates a device that can be used for both wireless voice (e.g. telephony) and wireless data (e.g. email, web browsing, text) communications. In a present embodiment, computing device 54 is a mobile electronic device with the combined functionality of a personal digital assistant, a cell phone, and an email paging device. Many well known cellular telephone models, or variants thereof, are suitable for the present embodiment.

Device 54 thus includes a plurality of input devices which in a present embodiment include a keyboard 200, a pointing device 202, and a microphone 204. Pointing device 202 can be implemented as a track wheel, trackball, touch-screen or the like. Input from keyboard 200, pointing device 202 and microphone 204 is received at a processor 208. Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of device 54 as described herein are typically maintained, persistently, in non-volatile storage unit 212 and used by processor 208 which makes appropriate utilization of volatile storage 216 during the execution of such programming instructions. Those skilled in the art will now recognize that non-volatile storage unit 212 and volatile storage 216 are non-limiting examples of computer readable media that can store programming instructions executable on processor 208.

Processor 208 in turn is also configured to control a speaker 220 and a display 224. Processor 208 also connects to a network interface 228, which are implemented in a present embodiment as radios configured to communicate over link 70. In general, it will be understood that interface 228 is configured to correspond with the network architecture that is used to implement link 70. (In other embodiments a plurality of links 70 with different protocols can be employed and thus a plurality of interfaces can be provided to support each link.) It should be understood that in general a wide variety of configurations for device 54 are contemplated.

In a present embodiment, device 54 is also configured to maintain packet manager application 74. Packet manager application 74 is configured to cooperate with packet manager application 67 in order to manage loss of packets in transmissions between server 58 and device 54. Packet manager application 74 is maintained within non-volatile storage 212. Processor 208 is configured to execute packet manager application 74. Device 54 also includes a battery 240 or other power supply. Battery 240 provides power to components within device 54.

Referring again to FIG. 1, server 58 can be based on any well-known server environment including a module that houses one or more central processing units, volatile memory (e.g. random access memory), persistent memory (e.g. hard disk devices) and network interfaces to allow server 58 to communicate over relevant links. For example, server 58 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for server 58 is contemplated. Those skilled in the art will now recognize that non-volatile storage and volatile storage are non-limiting examples of computer readable media that can store programming instructions executable on the processor of server 58.

Figure 3:
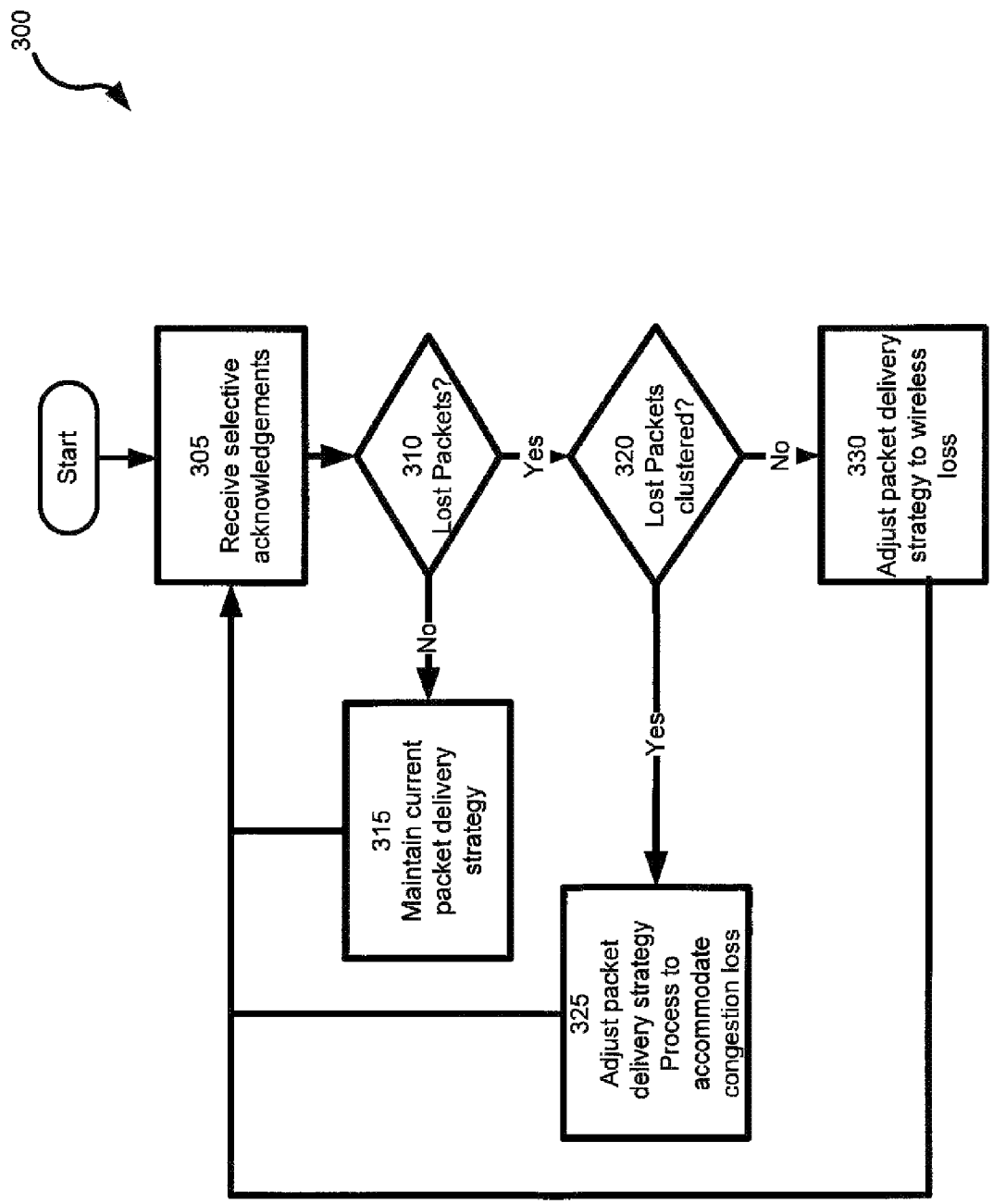
FIG. 3 shows a flow-chart depicting a method for improving packet throughput based on classification of packet loss in data transmissions.

Referring now to FIG. 3, a flowchart depicting a method for determining the cause of packet loss in data transmissions is indicated generally at 300. Method 300 can be implemented on system 50 or a suitable variation thereof.

Figure 4:
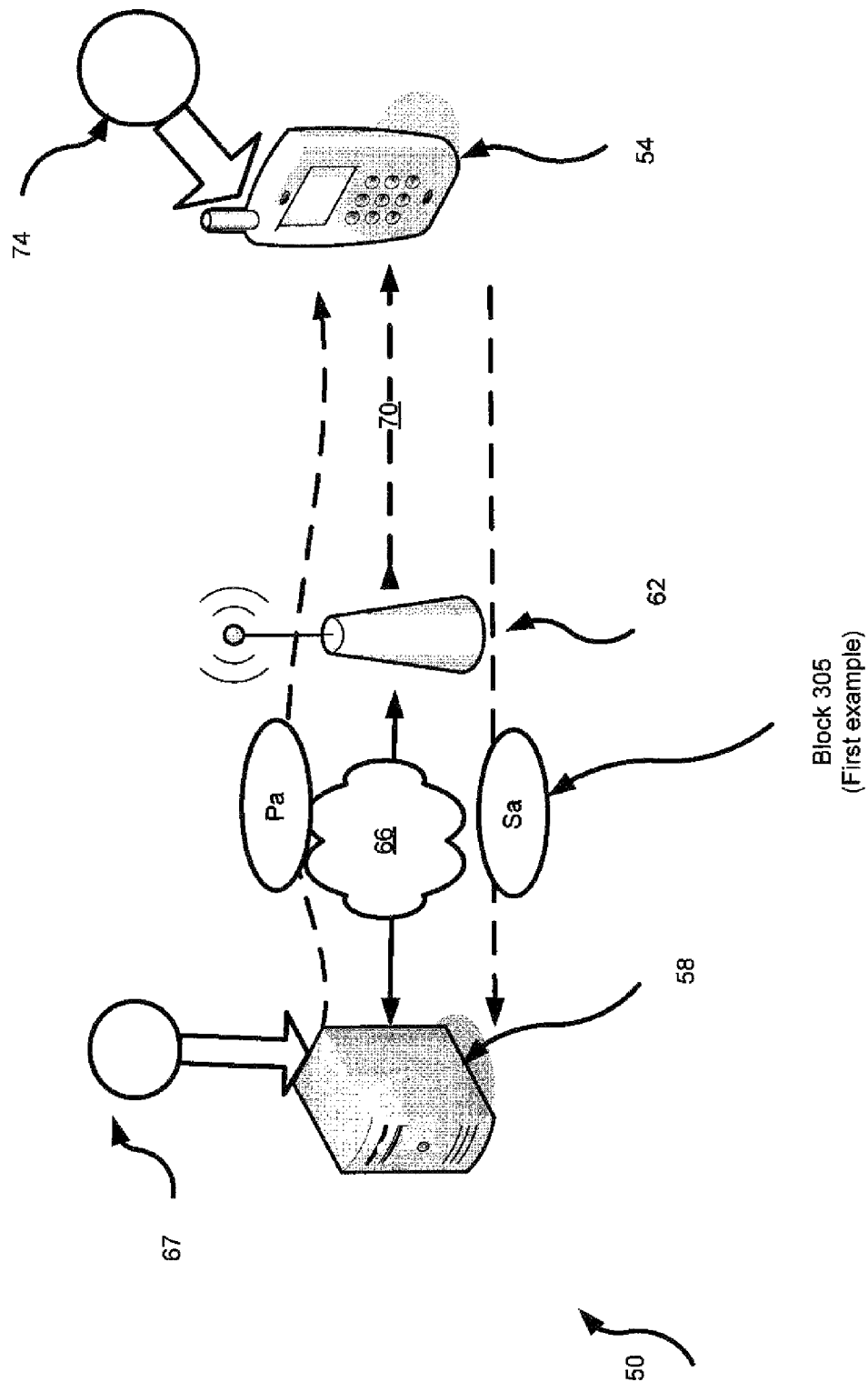
FIG. 4 shows the system of claim 1 during exemplary performance of the method in FIG. 3.

To assist in explaining method 300, certain assumptions will be made according to a specific example is shown in FIG. 4, wherein server 58 is configured to send a plurality of packets Pa via wired link 66 and wireless link 70 to device 54. Such packets Pa are sent according to a defined delivery strategy that is configured to accommodate known or expected characteristics of link 66 and link 70 and to thereby obtain an optimum (for example, where circumstances permit, a maximum) bit rate for packets Pa. During an initial transmission of packets from server 58 to device 54, such characteristics may not be known and accordingly a default delivery strategy is employed. Such a default delivery strategy can employ, for example, selected transmission rates, error correction techniques like forward error correction (FEC). A delivery strategy can include increasing the data transmission rate every so often provided that no congestion is detected.

In a present embodiment packets Pa are sent via a transport protocol. The transport protocol that is chosen inherently includes the ability to adjust delivery via congestion control and utilizes packet loss as an indication of congestion. An example of a transport protocol is the Transport Control Protocol (TCP). Another example transport protocol is the Stream Control Transmission Protocol (SCTP).

Also in the example in FIG. 4, device 54 is configured to send selective acknowledgements Sa that correspond to the reception of packets Pa at device 54. As an example, selective acknowledgements Sa can conform to the selective acknowledgments discussed in Mathis et al, Request for Comments: 2018, "RFC 2018—TCP Selective Acknowledgement Options", October 1996). Thus, in this example, packet manager application 74 can be configured to send selective acknowledgements Sa utilizing functionality that is described in RFC 2018.

According to the example in FIG. 4, it will be assumed that selective acknowledgements Sa indicate that ALL packets Pa were received at device 54.

Thus, continuing with the example in FIG. 4, block 305 comprises receiving selective acknowledgements Sa at server 58. Block 310 comprises determining if any packets were lost based on the selective acknowledgements received at block 305. In the example discussed in relation to FIG. 4, selective acknowledgements Sa indicated that ALL packets Pa were received, and therefore a "No" determination is reached at block 310. Block 315 comprises maintaining the current packet delivery strategy and then method 300 cycles back to block 305. Recall that where a current strategy includes periodically increasing the data transmission rate provided that no congestion is detected, then "maintaining" can comprise such periodic increasing.

Figure 5:
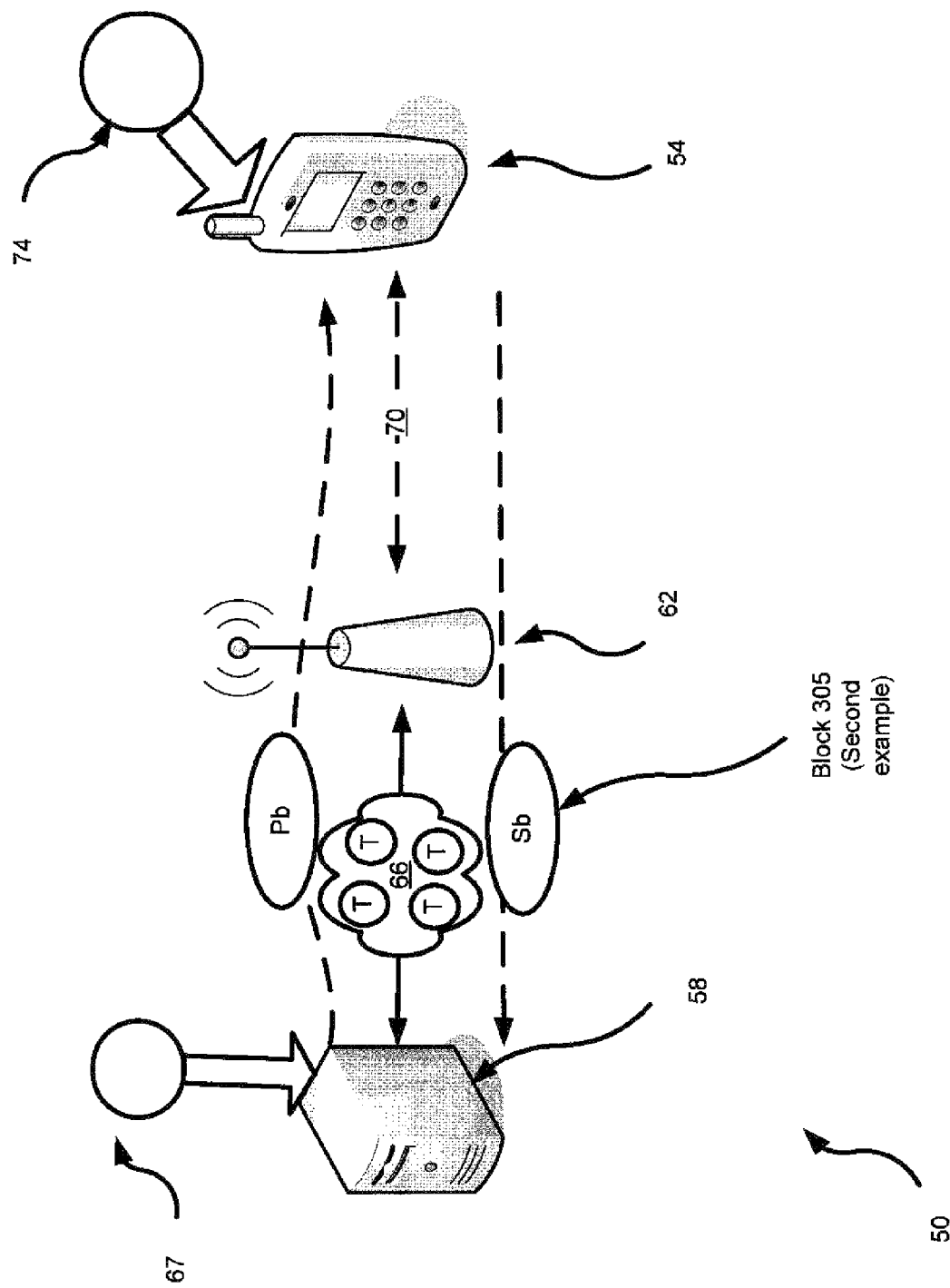
FIG. 5 shows the system of claim 1 during a second exemplary performance of the method in FIG. 3.

To further assist in explaining method 300, certain assumptions will be made according to another specific example shown in FIG. 5, wherein, like FIG. 4 server 58 is configured to send a plurality of packets Pb via wired link 66 and wireless link 70 to device 54. Like the example in FIG. 4, packets Pb are sent according to a defined delivery strategy and packets Pb are sent via a transport protocol. Also like the example in FIG. 4, in the example in FIG. 5 device 54 is configured to send selective acknowledgements Sb that correspond to the reception of packets Pb at device 54. However in the example, link 66 is shown as also carrying a plurality of other traffic T, and thus, in the example in FIG. 5, link 66 is congested. Thus, according to the example in FIG. 5, it will be assumed that selective acknowledgements Sb indicate packet loss occurred at device 54. FIG. 6 shows a representation of selective acknowledgements Sb, which indicate that; first packet Pb-1; second packet Pb-2; sixth packet Pb-6; and eighth packet Pb-8 of packets Pb were NOT received, while the remainder of the packets in packets Pb were received.

Thus, at block 310 in this second example, it is determined that "Yes", certain packets were lost. Block 320 comprises determining if the lost packets were clustered. Various criteria can be defined as to what characteristics of packet loss establish clustered packet loss and thereby reach a "yes" determination at block 320. In a present embodiment according to this example, the loss of at least a first predefined number ("X") of packets, out of a second predefined number ("Y") of consecutively-transmitted packets and within a predefined time span ("Z") will satisfy the established criteria. The predefined number X can be as low as two. The predefined number X can be greater. The predefined number Y is greater than X.

Referring again to FIG. 6 in relation to block 320, it can be noted that first packet Pb-1 and second packet Pb-2 were not received and this satisfies the criteria of a loss of at least two packets, within a certain time span and a certain span of sequence, thereby leading to a "yes" determination at block 320.

Assuming a "yes" determination is made at block 320, then at block 325 the packet delivery strategy is adjusted to accommodate for congestion loss. In this example, the congestion due to traffic T has been detected and the packet delivery strategy is adjusted to accommodate for this congestion. The selected congestion loss packet delivery strategy at block 325 is not particularly limited, but examples of such congestion loss packet delivery strategies will be discussed further below.

After block 325 method 300 cycles back to block 305.

Figure 7:
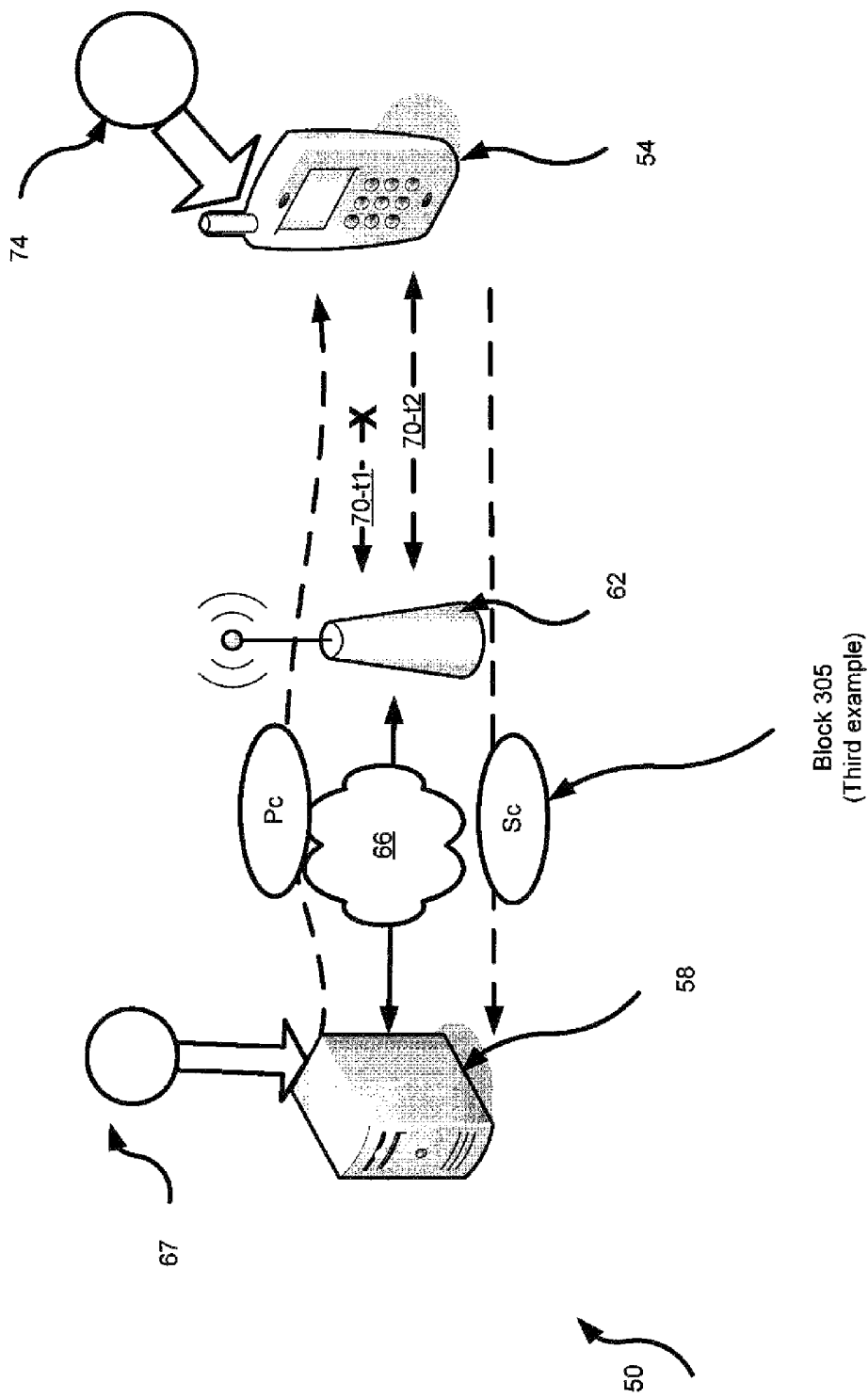
FIG. 7 shows the system of claim 1 during a third exemplary performance of the method in FIG. 3.

To further assist in explaining method 300, certain assumptions will be made according to another specific example shown in FIG. 7, wherein, like FIG. 4 server 58 is configured to send a plurality of packets Pc via wired link 66 and wireless link 70 to device 54. Like the example in FIG. 4, packets Pc are sent according to a defined delivery strategy and packets Pc are sent via a transport protocol. Also like the example in FIG. 4, in the example in FIG. 7 device 54 is configured to send selective acknowledgements Sc that correspond to the reception of packets Pc at device 54. However in the example, link 70 is shown as occurring over two time periods, represented using references 70-t1 and 70-t2, together corresponding to the transmission of packets Pc. At time period one, link 70-t1 has been interrupted such that link 70-t1 is broken and no complete link exists between base station 62 and device 54. Such breakage can occur for any variety of reasons, such as an object passing along the path between base station 62 and device 54, or interference from another adjacent radio link. However, at time period two, link 70-t2 is intact and corresponds to the previously discussed functionality in relation to link 70.

Figure 8:
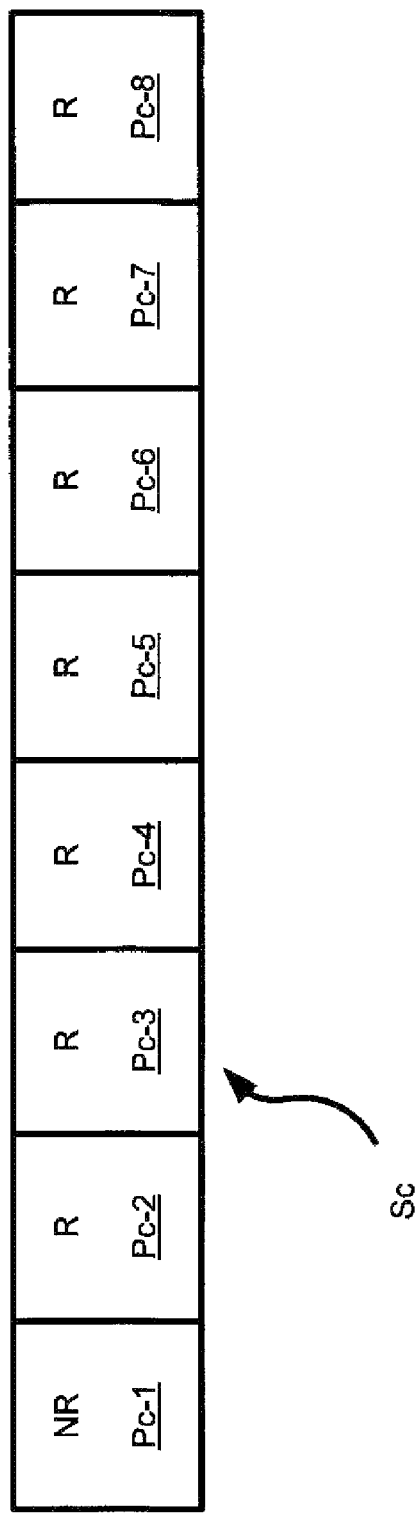
FIG. 8 shows a representation of the structure of selective acknowledgements from FIG. 7.

Thus, according to the example in FIG. 8, it will be assumed that selective acknowledgements Sc indicate packet loss occurred at device 54. FIG. 8 shows a representation of selective acknowledgements Sc, which indicate that; first packet Pc-1; was NOT received, while the remainder of the packets in packets Pc were received. Thus, according to selective acknowledgements Sc, only one packet has been lost.

Thus, at block 310 in this third example, it is determined that "Yes", certain packets were lost. Block 320 comprises determining if the lost packets were clustered. Referring again to FIG. 8 in relation to block 320, it can be noted that only packet Pc-1 was not received. Therefore, according to the previously-discussed criteria example, the determination at block 320 is "no", because less than two packets were lost within the time span and a sequence of selective acknowledgements Sc.

Since a "no" determination is made at block 320, then at block 330 the packet delivery strategy is adjusted to accommodate for wireless loss. In this example, the congestion due to the erratic behavior of link 70-t1 and link 70-t2 has been detected and the packet delivery strategy is adjusted to accommodate for these wireless losses. It will be understood that wireless loss is a type of loss due to residual errors or transmission errors in link 70. The selected wireless loss packet delivery strategy at block 325 is not particularly limited, but examples of such congestion loss packet delivery strategies will be discussed further below. After block 330 method 300 cycles back to block 305.

It should be understood that method 300 can be performed on portable computing device 54 based on selective acknowledgements received from server 58.

As indicated earlier, the strategies for block 325 and block 330 are not particularly limited. In a specific embodiment, the congestion loss delivery strategy for block 325 is configured to reduce the data transmission rate by a first factor, and the corresponding wireless loss delivery strategy for block 330 is configured to reduce the data transmission rate by a second factor. The second factor can also be configured to be an amount that is less than the first factor, such that the data transmission rate for wireless congestion still includes a reduction, but a reduction that is a lesser amount compared with congestion loss. The second factor can also be selected to be zero, such that in effect the wireless loss delivery strategy is to maintain the existing delivery strategy. The second factor can also be configured to vary according to the first factor, and the first factor dynamically varied over time in order to determine a transmission rate that achieves a predefined accepted loss.

In general, it should be understood that the teachings can be modified to apply to any sending computer and receiving computer joined by a link or any shared medium over which, in addition to packet loss caused by congestion, there is a non-negligible number of packets lost due to transmission errors.

Also, in general, it should be understood that wireless loss can be considered a specific case of transmission error loss, whereby packets are discarded due to errors introduced during the data transmission, for example due to thermal noise or interference. The wireless medium is an example of a medium where transmission error loss can occur. In the case when error control procedures are used (for example forward error correction (FEC) or Automatic Retransmission Request (ARQ)), any residual errors not detected and corrected by the error control procedure can contribute to transmission errors.

Combinations, subsets and variations of the foregoing are also contemplated. For example, the criteria discussed above in the example in relation to FIGS. 4-8, can bean varied. An example of such varied criteria is that the loss of at least two clusters can be required in order to reach a "Yes" determination at block 320. Thus, according to the example in FIG. 6, this variation criteria would lead to a "No" determination at block 320 as only one cluster is lost according to selective acknowledgements Sb. In another variation embodiment, a cluster can also be deemed to occur if there are at least X1 lost packets out of Y1 consecutively-transmitted packets within a predefined time span Z1 OR if there's at least X2 lost packets out of Y2 consecutively-transmitted packets within time span Z2, where X2>=X1, Y2>=Y1, and Z2>=Z1.

The claims attached hereto define the scope of the monopoly sought.

The invention claimed is:

1. A computer method for improving packet throughput comprising:
   receiving, at a sending computer, selective acknowledgements from a receiving computer that is connected to said sending computer by a link that is shared with at least one additional computer; said selective acknowledgements responsive to packets sent from said sending computer to said receiving computer according to a delivery strategy;
   determining from said selective acknowledgements whether any of said packets were lost;
   if said selective acknowledgements indicate none of said packets were lost, maintaining said delivery strategy;
   if said selective acknowledgements indicate packets were lost, determining if any of said lost packets were clustered;
   if said lost packets were clustered, adjusting said delivery strategy using a first factor to accommodate a first type of packet loss;
   if said lost packets were not clustered, adjusting said delivery strategy using a second factor to accommodate a second type of packet loss.

2. The method of claim 1 wherein said first type of packet loss is loss due to congestion on said link.

3. The method of claim 2 wherein said first factor comprises reducing a data transmission rate.

4. The method of claim 1 wherein said second type of packet loss is loss due to transmission errors.

5. The method of claim 4 wherein at least a portion of said link is wireless and said transmission errors occurs over said wireless portion.

6. The method of claim 4 wherein at least a portion of said link is characterized by a non-negligible chance of packet loss due to transmission error.

7. The method of claim 4 wherein said second factor comprises no adjustment to said delivery strategy.

8. The method of claim 1 wherein said first type of packet loss is congestion loss.

9. The method of claim 1 wherein said first type of packet loss is congestion loss and said second type of packet loss is loss due to transmission errors.

10. The method of claim 9 wherein said first factor comprises reducing a data transmission rate by a first amount and said second factor comprises reducing said data transmission rate by a second amount; said second amount being less than said first amount.

11. The method of claim 10 wherein said second amount is zero.

12. The method of claim 1 further comprising:
if said lost packets were not clustered, maintaining said delivery strategy.

13. A computer comprising:
an interface connected to a network configured to receive selective acknowledgements from a receiving computer that is connected to said interface by a link that is shared with at least one additional computer; said selective acknowledgements responsive to packets sent from via said interface to said receiving computer according to a delivery strategy;
a processor connected to said interface and configured to maintain said delivery strategy; said processor further configured to determine from said selective acknowledgements whether any of said packets were lost;
said processor further configured to maintain said delivery strategy if said selective acknowledgements indicate none of said packets were lost,
said processor further configured to determine whether any of said lost packets where clustered if said selective acknowledgements indicate packets were lost;
said processor configured to adjust said delivery strategy using a first factor to accommodate a first type of packet loss if said lost packets were clustered;
said processor further configured to adjust said delivery strategy using a second factor if said lost packets were not clustered in order to accommodate a second type of packet loss.

14. The computer of claim 13 wherein the computer is a portable electronic device.

15. The computer of claim 13 wherein the computer is a server.

16. The computer of claim 13 wherein said first type of packet loss is loss due to congestion on said link.

17. The computer of claim 16 wherein said first factor comprises reducing a data transmission rate.

18. The computer of claim 13 wherein said second type of packet loss is loss due to transmission errors.

19. The computer of claim 18 wherein at least a portion of said link is wireless and said transmission errors occurs over said wireless portion.

20. The computer of claim 18 wherein at least a portion of said link is characterized by a non-negligible chance of packet loss due to transmission error.

21. The computer of claim 18 wherein said second factor comprises no adjustment to said delivery strategy.

22. The computer of claim 13 wherein said first type of packet loss is congestion loss.

23. The computer of claim 13 wherein said first type of packet loss is congestion loss and said second type of packet loss is loss due to transmission errors.

24. The method of claim 23 wherein said first factor comprises reducing a data transmission rate by a first amount and said second factor comprises reducing said data transmission rate by a second amount; said second amount being less than said first amount.

25. The computer of claim 24 wherein said second amount is zero.

26. A system comprising:
a sending computer connectable to a link;
a receiving computer connectable to said sending computer via said link;
said sending computer configured to receive selective acknowledgements from said receiving computer; said selective acknowledgements responsive to packets sent from said sending computer to said receiving computer according to a delivery strategy;
said sending computer configured to maintain said delivery strategy; said sending computer further configured to determine from said selective acknowledgements whether any of said packets were lost;
said sending computer further configured to maintain said delivery strategy if said selective acknowledgements indicate none of said packets were lost,
said sending computer further configured to determine whether any of said lost packets where clustered if said selective acknowledgements indicate packets were lost;
said sending computer configured to adjust said delivery strategy using a first factor to accommodate a first type of packet loss if said lost packets were clustered;
said sending computer further configured to adjust said delivery strategy using a second factor if said lost packets were not clustered in order to accommodate a second type of packet loss.

27. A computer readable storage device containing programming instructions executable on a processor of a sending server; said programming instructions comprising the method of:
receiving, at a sending computer, selective acknowledgements from a receiving computer that is connected to said sending computer by a link that is shared with at least one additional computer; said selective acknowledgements responsive to packets sent from said sending computer to said receiving computer according to a delivery strategy;
determining from said selective acknowledgements whether any of said packets were lost;
if said selective acknowledgements indicate none of said packets were lost, maintaining said delivery strategy;
if said selective acknowledgements indicate packets were lost, determining if any of said lost packets were clustered;
if said lost packets were clustered, adjusting said delivery strategy using a first factor to accommodate a first type of packet loss;
if said lost packets were not clustered, adjusting said delivery strategy using a second factor to accommodate a second type of packet loss.

* * * * *